Dec. 13, 1949     G. LAKE     2,491,008
FISHING POLE HOLDER
Filed Nov. 4, 1946
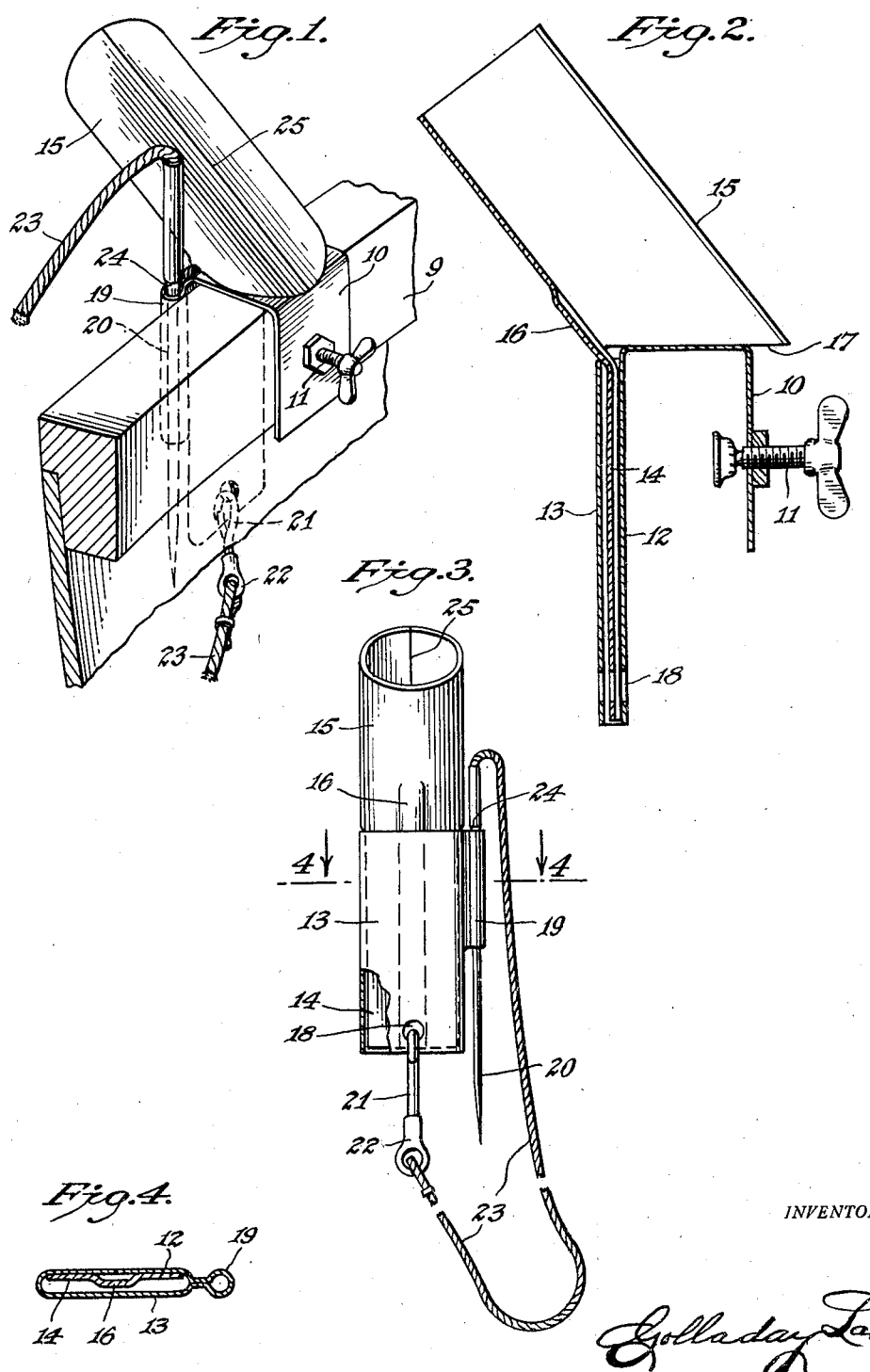

Patented Dec. 13, 1949

2,491,008

UNITED STATES PATENT OFFICE 2,491,008

FISHING POLE HOLDER

Golladay Lake, Grenada, Miss.

Application November 4, 1946, Serial No. 707,575

4 Claims. (Cl. 248—42)

This invention relates to devices for holding a fishing pole. It has for an object to provide a simple and inexpensive device of this class. Another object is to provide such device which is capable of being quickly and easily attached to and detached from a gunwale or thwart of a small boat, especially a row boat to enable the fisherman's hands to be free to row and troll. A further object is to enhance the utility of such a device by combining with it a line on which the fish already caught are kept in the water in a more nearly natural and horizontal position and therefore kept alive longer. Still another object is to have both the fishing pole holder and string line for the fish detachably held together as a unit in which the string line attachment functions as a lock for retaining the pole holder in position.

Various suggestions have heretofore been made for enabling a fishing pole to be held while the devotee of Isaac Walton is enabled to use his hands for other purposes. The present invention is an unusually simple holder readily attached to some convenient portion of a small boat such as a row boat and is combined with a fish stringing device.

Referring to the drawing:

Fig. 1 is a perspective view of one embodiment of this invention,

Fig. 2 is a longitudinal section through the device of Fig. 1,

Fig. 3 is a left side view of the device of Fig. 2, and,

Fig. 4 is a section on the line 4—4 of Fig. 3.

An inverted U-shaped bracket 10 is adapted to be fastened to the gunwale 9 of a small boat by means of the adjustable screw clamp 11 operated by the wing nut illustrated. The side 12 of the bracket opposite that through which the screw 11 passes constitutes one side of a guide channel formed between the side 12 and its opposite side 13. An extension 14 from the socket 15 fits within the guide channel to hold the socket in position for receiving a fishing pole. A reenforcing rib 16 shown in Figs. 2, 3, and 4 stiffens the socket and extension 14 at their junction where a maximum bending moment may occur. The bottom 17 of the socket portion rests on top of the bracket 10. The socket, rib, and bracket are all formed of sheet metal stiff enough for its intended purpose.

Perforations 18 in the sides 12 and 13 of the guide channel as well as extension 14 are alined as shown in Fig. 2. A smaller or auxiliary socket 19 is formed at one side of the guide channel for reception of the needle-like threader 20 by means of which fish already caught are strung on the line 23. A fastener 21 passes through the perforations of the guide channel and extension to retain the pole receiving socket 15 locked to the bracket 10. An eyelet 22 at the end of the fastener 21 enables the string line 23 to be tied thereto in some convenient manner. The opposite end of this line 23 is gripped within some usual type fastening socket on the end of the threader 20, there being a shoulder 24 formed for supporting the threader 20 in the small socket 19.

Among advantages of this invention may be mentioned, the socket is quickly and easily attached and detached from a gunwale or thwart. The fastener 21 holds the socket to the bracket and prevents the socket becoming accidently disengaged. The socket 15 may be longer than that illustrated and of length sufficient to provide the desired support for the end of a fishing pole. A longitudinal seam 25 in the socket is shown as being merely closed without being soldered or welded although where desired this seam may be reenforced by brazing or welding or held closed in any other well-known manner. The string line being looped enables the fish carried thereon to be maintained in a more nearly horizontal position in which the fish naturally swims when alive so that this type of string line has the advantage over the usual single or unlooped line for this reason. The connection of the string line to either or both the fastener 21 and threader 20 may be swivelled to prevent the line from twisting. While the pole is easily removable from the open end of the socket 15 nevertheless where the socket snugly fits the end of a pole this socket as well as the pole may be removed from the bracket to constitute a convenient grip for holding the pole by the socket and extension 14 when unsupported by the bracket. The bracket may also be attached to the side edge of a seat or thwart to provide a convenient support for the fishing pole while trolling.

What is claimed is:

1. A pole support and fish stringer combination comprising a bracket, clamping means secured to the bracket for attaching the same to a support, a guide channel on the side of said bracket opposite said clamping means, a pole receiving socket mounted on the portion of said bracket connecting the sides thereof, an extension from said socket for reception in said guide channel, a strengthening rib on said extension and the portion of the socket adjacent thereto, a flexible fish stringer, a fastener at one end of said stringer adapted to pass through perforations in the channel and extension for securing the stringer to said bracket and extension and for locking the extension against being withdrawn from said channel, a smaller socket formed along one side of said bracket, a needle-like threader secured to the opposite end of the stringer from said fastener, a shoulder on said threader between its point and the stringer attachment, whereby the said threader may be held in the smaller socket and the stress of any fish on said stringer tends to retain the threader in the smaller socket.

2. A pole support comprising a bracket, a pole supporting socket mounted on said bracket, an extension from said socket, a guide channel extending along said bracket and shaped to receive said extension, and a removable fastening means engaging both said extension and said guide channel, said fastening means constituting an anchorage for one end of a flexible fish stringer.

3. A pole support comprising a bracket, clamping means for said bracket, a pole supporting socket mounted on said bracket, an extension from said socket a guide channel extending along said bracket and shaped to receive said extension, and a removeable fastening means engaging both said extension and said guide channel, said fastening means consituting an anchorage for one end of a flexible fish stringer, the opposite end of said stringer having thereon a rigid needle-like threader, and said bracket being provided with an upstanding smaller socket in which said threader may be received, the flexible stringer being secured to an end of the threader whereby tension on the stringer due to fish thereon, tends to hold said threader in its socket.

4. A fish pole receiving socket having an extension projecting below the bottom of said socket, a support having a guide in which said extension is received when the socket rests on said support, and a detachable fastening means for securing said socket contiguous said support and enabling the socket to be removed from said support when said fastening means is detached from the socket extension, said detachable fastening means including a portion adapted to be passed through alined transverse perforations in said guide and extension and when detached is held to said support by a flexible connection.

GOLLADAY LAKE.

REFERENCES CITED

The following references are of record in the file of this patent:

UNITED STATES PATENTS

| Number | Name | Date |
|---|---|---|
| 849,410 | Mills | Apr. 9, 1907 |
| 911,149 | Moore | Feb. 2, 1909 |
| 916,413 | Biederman | Mar. 30, 1909 |
| 1,350,390 | Stein | Aug. 24, 1920 |
| 2,055,842 | Haislip | Sept. 29, 1936 |
| 2,174,140 | Schofield | Sept. 26, 1939 |

FOREIGN PATENTS

| Number | Country | Date |
|---|---|---|
| 1,919 | Great Britain | Jan. 22, 1884 |